US012627870B2

(12) United States Patent
Alfano et al.

(10) Patent No.: US 12,627,870 B2
(45) Date of Patent: May 12, 2026

(54) REDUNDANT REMOTE CAMERA SYSTEM

(71) Applicant: TAIT TOWERS MANUFACTURING, LLC, Lititz, PA (US)

(72) Inventors: David Alexander Alfano, Lancaster, PA (US); Christopher M. Rybitski, Lancaster, PA (US); Paul M. Sapsis, Philadelphia, PA (US)

(73) Assignee: Tait Towers Manufacturing, LLC, Lititz, PA (US)

( * ) Notice: Subject to any disclaimer, the term of this patent is extended or adjusted under 35 U.S.C. 154(b) by 176 days.

(21) Appl. No.: 18/452,667

(22) Filed: Aug. 21, 2023

(65) Prior Publication Data

US 2025/0071400 A1 Feb. 27, 2025

(51) Int. Cl.
| | |
|---|---|
| *H04N 23/51* | (2023.01) |
| *B64U 20/80* | (2023.01) |
| *B64U 101/30* | (2023.01) |
| *G03B 17/56* | (2021.01) |
| *H04N 23/66* | (2023.01) |

(52) U.S. Cl.
CPC ............. *H04N 23/51* (2023.01); *B64U 20/80* (2023.01); *G03B 17/56* (2013.01); *H04N 23/66* (2023.01); *B64U 2101/30* (2023.01)

(58) Field of Classification Search
CPC ........ H04N 23/51; H04N 23/66; B64U 20/80; B64U 2101/30; G03B 17/56
See application file for complete search history.

(56) References Cited

U.S. PATENT DOCUMENTS

| | | | | |
|---|---|---|---|---|
| 7,793,137 | B2 * | 9/2010 | Karam | H04L 1/22 |
| | | | | 714/4.12 |
| 8,549,331 | B2 * | 10/2013 | Karam | H04L 1/22 |
| | | | | 713/340 |
| 8,768,492 | B2 | 7/2014 | Fisher | |
| 8,909,379 | B2 | 12/2014 | Fisher | |
| 11,586,274 | B2 * | 2/2023 | Hartwell | G06F 1/26 |
| 2003/0099076 | A1 * | 5/2003 | Elkayam | H04L 9/40 |
| | | | | 361/90 |
| 2005/0024004 | A1 * | 2/2005 | Rodnunsky | F16M 11/048 |
| | | | | 318/649 |
| 2011/0161692 | A1 * | 6/2011 | Hussain | H04L 12/10 |
| | | | | 713/300 |
| 2015/0205336 | A1 * | 7/2015 | Walker | G06F 1/30 |
| | | | | 713/340 |
| 2017/0026188 | A1 * | 1/2017 | Herzel | G06F 1/30 |
| 2017/0295352 | A1 * | 10/2017 | Ihlenburg | H04N 7/181 |
| 2018/0307451 | A1 * | 10/2018 | Yamazaki | H04N 21/436 |
| 2018/0332236 | A1 * | 11/2018 | Glaser | G08B 13/19656 |
| 2018/0342905 | A1 * | 11/2018 | Fukaya | H02J 50/20 |
| 2019/0181509 | A1 * | 6/2019 | Ohtsuka | H01M 10/441 |
| 2021/0402939 | A1 * | 12/2021 | Obayashi | B60R 16/033 |

* cited by examiner

*Primary Examiner* — Timothy J Henn
(74) *Attorney, Agent, or Firm* — Saxton & Stump, LLC

(57) ABSTRACT

A control system and a method for providing redundancy for a flying camera assembly that monitors interface quality for discrete power and communication interfaces between the flying camera system and a ground-based control system, and automatically switches to an alternate interface should quality of a then-active interface become degraded or unavailable.

17 Claims, 6 Drawing Sheets

REDUNDANT REMOTE CAMERA SYSTEM

FIELD OF THE INVENTION

The present disclosure is generally directed to flying camera systems used in live-performance and, more particularly, to a system providing automatic redundancy in flying camera power and control systems.

BACKGROUND OF THE INVENTION

Camera systems suspended from dynamic catenary lines are often used in film and live event productions to achieve dynamic shots that would be impossible to capture with other methods. These flying camera systems offer numerous advantages over cranes, jibs, and dollies—be it their speed, coverage, or comparatively small equipment footprint in the immediate shooting area. Flying camera systems traditionally include a camera, a camera stabilizing gimbal, remote lens control, multiple winch and control systems, power delivery system, remote communications for gimbal and camera controls, and a video transmission system.

Traditionally, when flying camera systems are deployed to shoot prerecorded and edited content (i.e., feature films), all aspects of the camera controls system are wireless and the gimbal and camera payload are battery powered. In the event wireless interference causes a drop in communications during a shot, the crew can fix the system and reshoot the scene. Conversely, in live broadcast environments there is no opportunity to go back and reshoot so reliable wired data communications and video transmission lines are paramount. As such, live broadcast systems are traditionally battery and/or power down-the-line powered and implement payload lifting ropes that feature an integral fiber optic core for communication. Video and data communications signals are converted to light at the camera dolly, transmitted over the fiber optic core in the lifting lines, and then converted back at the winch end of the rope. In this way, broadcast catenary suspended camera systems offer dependable ultra-high-definition video.

These systems are however not without their flaws. Operation of battery-only powered systems can be unpredictable. Battery performance may be negatively impacted by ambient conditions in systems deployed outdoors. Energy demand by the camera and dolly system can vary widely from event to event based on coverage area, performer movement, wind loading, and the like. Consequently, batteries may need to be swapped frequently or significantly oversized which increases flying camera system weight and in turn decreases overall system performance. In other instances, such as permanent installations in theatres, studios, or event spaces, batteries may be disfavored simply because they require routine changes and maintenance.

For systems that solely rely on power delivery via power down-the-line ropes, dolly payload performance may be negatively impacted by line voltage fluctuations due to conductor fatigue, slip ring failure, and/or failures in other elements of the power transmission system.

Another shortcoming of conventional catenary suspended broadcast camera systems that use fiber down-the-line lifting ropes, is that fiber optics are inherently fragile. Fiber optic cores are subjected to rough handling during the installation process and significant forces from the system dynamics during the course of an event or performance. These forces cause the fiber optic cores to fatigue and break resulting in a total loss of video signal and communications. Determining when failure might occur is notoriously difficult. To overcome fatigue and the unpredictability of breaks, fiber down-the-line ropes are only used for one or two events before being decommissioned and replaced. These ropes are expensive, and for live touring shows or long term parament installs, the expense of constantly replacing ropes—even if they still work—is untenable.

What is needed is a control system for a flying camera system that monitors interface quality for discrete power and communication interfaces and automatically switches to an alternate interface should quality of a then-active interface become degraded or unavailable.

SUMMARY OF THE INVENTION

Accordingly, the present invention, in any of the embodiments described herein, may provide one or more of the following advantages:

In one embodiment, a control system for managing operation of a flying camera system includes a local interface disposed on the flying camera, a first interface, a second interface, and a selector configured to monitor connection integrity between the local interface and the first interface, and the local interface and the second interface, and to operably connect the local interface to the first interface or the second interface based on a selection criteria. The interfaces may involve power supply for the flying camera system. The first interface may be one or more power conductors directed in or along one of the flying camera suspension lines, known as down-the-line power delivery. Power is supplied at the winch end of the suspension line through a slip ring or the like, to the power conductors. The conductors connect to the flying camera assembly, where the power is used to operate the camera and controls. The second interface may be a battery supply located on the flying camera assembly. The selector is operably connected to the down-the-line power feed conductors and the on-board battery supply which allows the selector to monitor available voltage. Upon detection of a loss of voltage in one of the interfaces, the selector automatically switches to the other interface which enables power delivery to the camera assembly local interface to continue uninterrupted operation. The number of interfaces may be greater than two allowing for redundant down-the-line power feeds to the camera assembly.

In another embodiment, a control system for managing operation of a flying camera system includes a local interface disposed on the flying camera, a first interface, a second interface, and a selector configured to monitor connection integrity between the local interface and the first interface, and the local interface and the second interface, and to operably connect the local interface to the first interface or the second interface based on a selection criteria. The interfaces may involve data communication between the flying camera assembly and a remote controller and/or receiver. The first interface may be one or more data communication cables directed in or along one of the flying camera suspension lines, known as down-the-line data communication. The data communication cable may be fiber optic. The second interface may be a wireless data transmission means. The selector is operably connected to the down-the line as well as the on-board wireless communication interface and configured to monitor signal quality and availability of each. Upon detection of a loss or degradation in data transmission capability in one of the interfaces, the selector switches to the other interface which enables continuation of the data communication. The number of interfaces may be greater than two and may include multiple down-the-line cables and/or wireless channels.

In another embodiment, a control system for managing operation of a flying camera system includes a local interface disposed on the flying camera, a first interface, a second interface, and a selector configured to monitor connection integrity between the local interface and the first interface, and the local interface and the second interface, and to operably connect the local interface to the first interface or the second interface based on a selection criteria. The selector is operably coupled to the local interface, the first interface, and the second interface and configured to monitor status of the interface. The selector may be configured to perform diagnostic monitor of the interfaces and to transmit diagnostic information to a system controller to instruct predictive and preventative maintenance activities necessary for camera system reliability.

In another embodiment, a control system for managing operation of a flying camera system includes a local interface disposed on the flying camera, a first interface, a second interface, and a selector configured to monitor connection integrity between the local interface and the first interface, and the local interface and the second interface, and to operably connect the local interface to the first interface or the second interface based on a selection criteria. The first interface may be down-the-line power conductors. The second interface may be an on-board battery system configured to supply power to the camera assembly. The battery system may include an on-board charger for maintaining battery capacity using the down-the-line power supply, while available. The battery system may operate with one or more batteries, the batteries being hot swappable to allow battery swaps without interrupting power to onboard components.

It is a still further object of the present invention to provide a control system for managing operation of a flying camera system includes a local interface disposed on the flying camera, a first interface, a second interface, and a selector configured to monitor connection integrity between the local interface and the first interface, and the local interface and the second interface, and to operably connect the local interface to the first interface or the second interface based on a selection criteria that is durable in construction, inexpensive of manufacture, carefree of maintenance, easily assembled, and simple and effective to use.

Other features and advantages of the present invention will be apparent from the following more detailed description of the preferred embodiment, taken in conjunction with the accompanying drawings which illustrate, by way of example, the principles of the invention.

BRIEF DESCRIPTION OF DRAWINGS

The advantages of this invention will be apparent upon consideration of the following detailed disclosure of the invention, especially when taken in conjunction with the accompanying drawings wherein.

Wherever possible, the same reference numbers will be used throughout the drawings to represent the same parts.

DETAILED DESCRIPTION OF THE INVENTION

Figure 1:
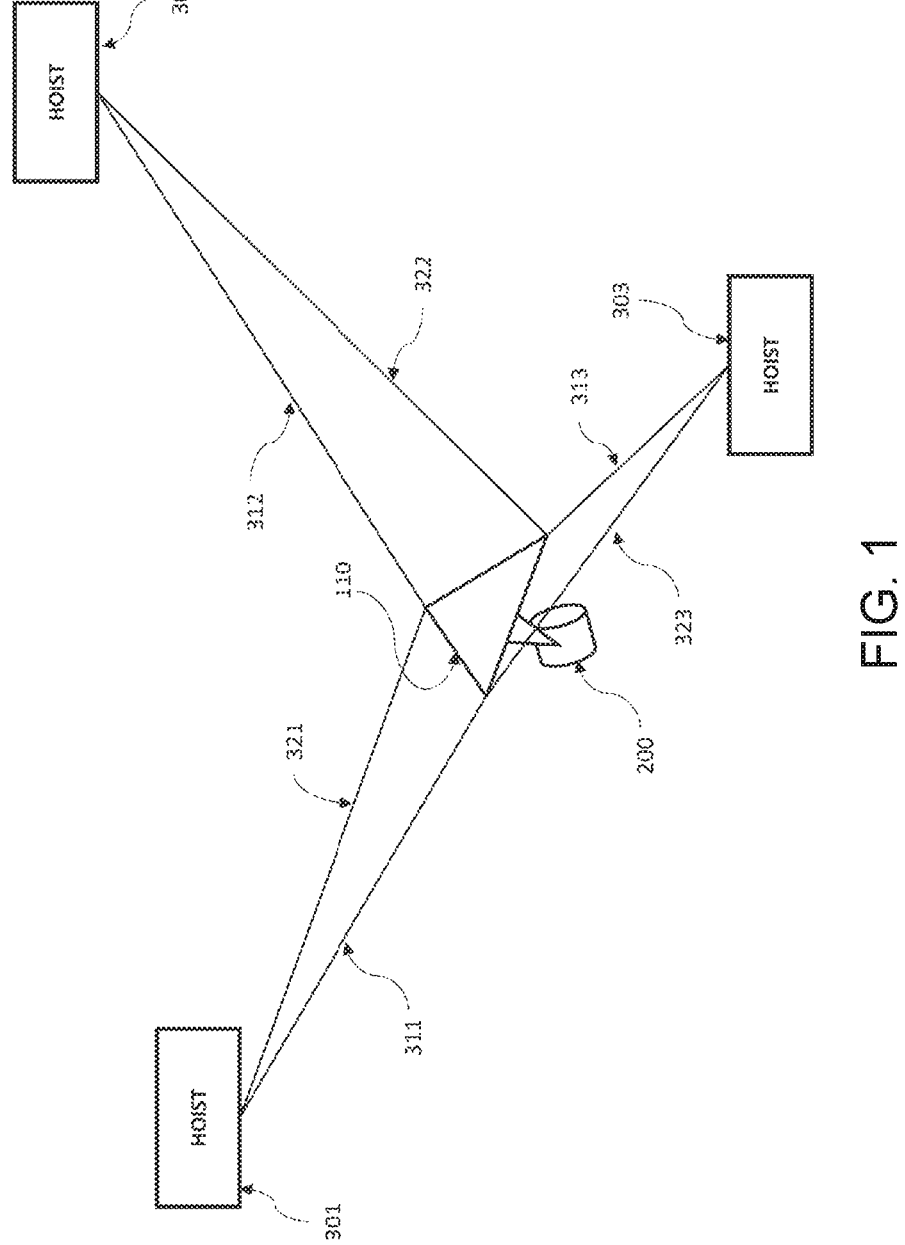
FIG. 1 illustrates a portion of supporting arrangement for a flying camera system.

The embodiments described herein relate to flying camera systems used in film and live event productions and means for increasing the reliability and availability of power supply and data communications systems to reduce the occurrence of interruptions in camera operation, particularly during live events when second takes are not an option.

The live performance industry is becoming increasingly dependent upon automation and motion control systems. The state of the art now includes large, distributed control models utilizing centralized systems directing multiple independent nodes wherein each node includes sufficient control capability to enable autonomous movement respondent to instructions from the centralized control system. One such system is disclosed in U.S. Pat. No. 8,768,492, "Automation and Motion Control System" issued to Fisher, the descriptive portions of which are incorporated herein by reference. The flying camera system on which the present invention finds utility may be one such node in a distributed automation and control system.

Referring to the Figures there is illustrated an exemplary flying camera system 100 according to the present disclosure. The flying camera system 100 includes a flying frame or dolly 110 to which the flying camera assembly 200 is attached. The dolly 110 is supported by a plurality of winches 301, 302, 303 and moved by a plurality of lifting ropes 311, 312, 313, 321, 322, 323, movement of each managed by respective winches. Operation of the winches is managed by a ground-based control system 500 to selectively move or position the flying frame in three-dimensional space. The movement may include translation of the flying dolly along x-, y-, and z-axes as well as rotation about those axes (pitch, roll, and yaw).

Subsystems and components of the flying camera assembly 200 are supported on the dolly 110, and may include a camera 210, a camera stabilizing gimbal, camera lens control system (focus, zoom, aperture), and video transmission system and an onboard control system 550 which manages power and data signal interface equipment that allows flying camera system operation and transmission of the video signal from the flying camera. The flying camera system 100 also includes ground-based systems, such as winch support, power, control, and video reception, to enable camera movement and to receive the video signal. Interfaces are provided to connect systems and components of the flying camera assembly to systems ground-based systems and components. Interfaces may be provided to power the flying camera assembly, to control camera parameters, such as motion control, white balance, iris, zoom, focus, color correction, and the like, to receive a video signal from the flying camera, or establish other necessary links between the ground-based and flying portions of the system 100.

As used herein, the term "ground-based" refers to systems and components that are not located on the flying camera assembly 200 or dolly 110 (e.g., not onboard). The term does not limit such designated systems and components to those that are earth-anchored.

Such flying camera systems are known in the art. One exemplar system is disclosed in U.S. Pat. No. 8,909,379, "Winch Control System" issued to Fisher, the descriptive portions of which are incorporated herein by reference.

Each winch is operably connected to a ground-based power supply 410 by power conductors 420 for motive power and to the ground-based control system 500 by data conductors 510 which enable control instruction and video communication between the ground-based control system and the flying camera system. The ground-based control system 500 may include a microprocessor 502, a memory device 504, and a plurality of input/output interfaces 506 allowing the microprocessor to operably communicate with the winches, the flying camera system, or other devices and/or node controllers that may be present. As part of a distributed control model, each winch may function as a node in the overall control system and include an individual controller to manage winch operation responsive to command instructions from the system controller.

Figure 2:
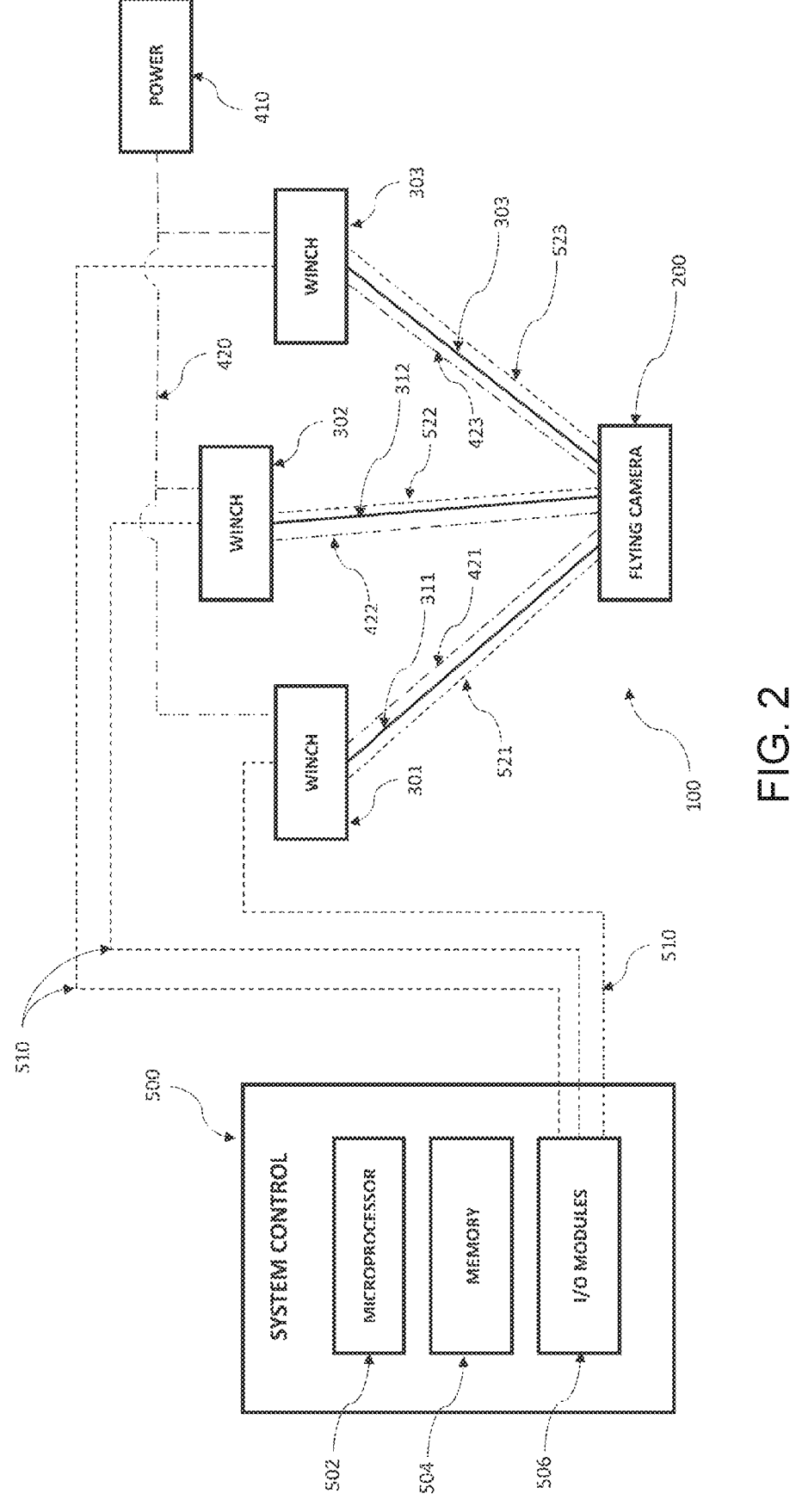
FIG. 2 schematically shows a portion of an automation and motion control system for a flying camera system.
Figure 3:
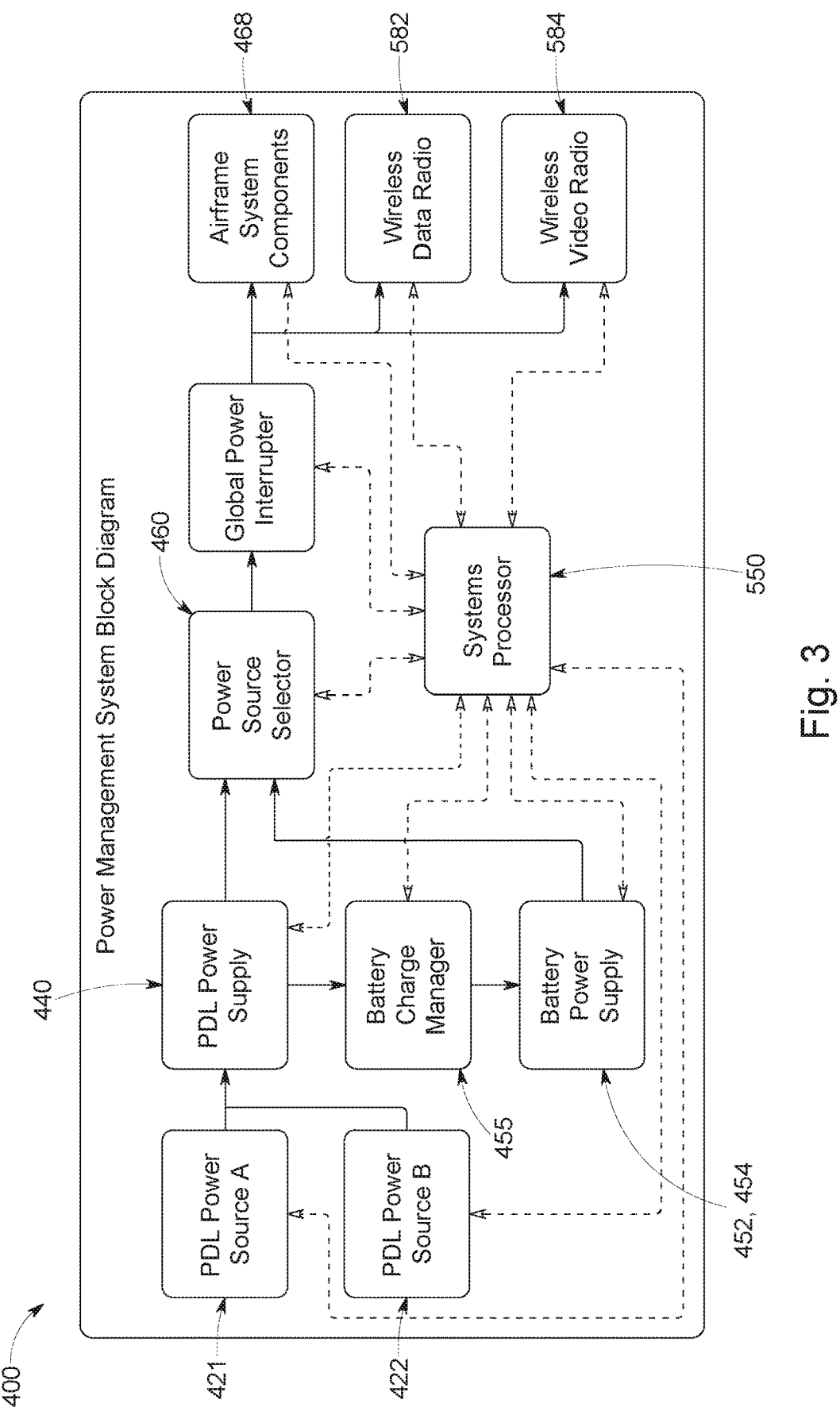
FIG. 3 shows a block diagram for one embodiment of a power management system for a flying camera system.
Figure 4:
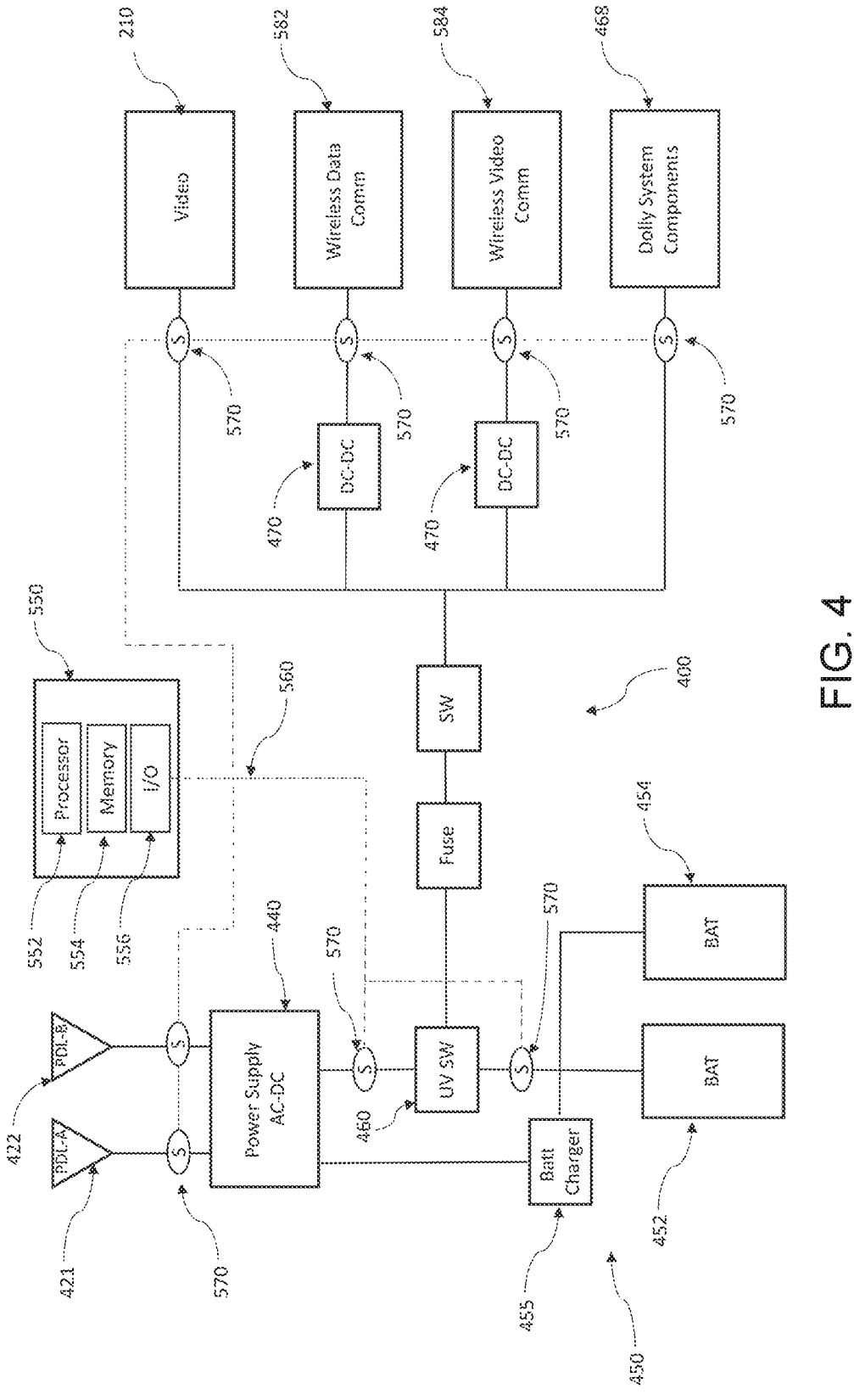
FIG. 4 schematically the power management system illustrated in FIG. 2.
Figure 5:
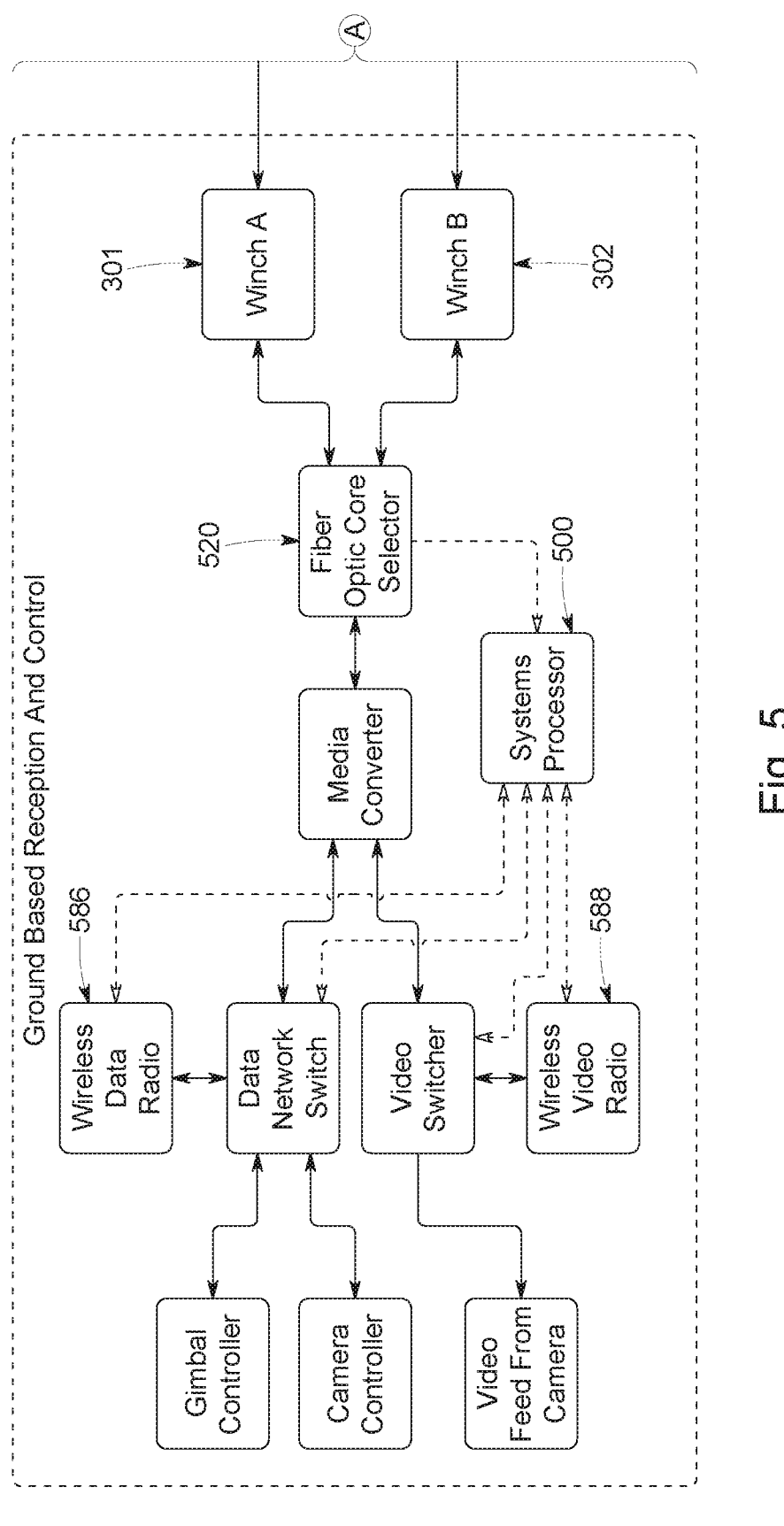
FIG. 5 schematically shows one embodiment of a data management system for a flying camera system.
Figure 5:
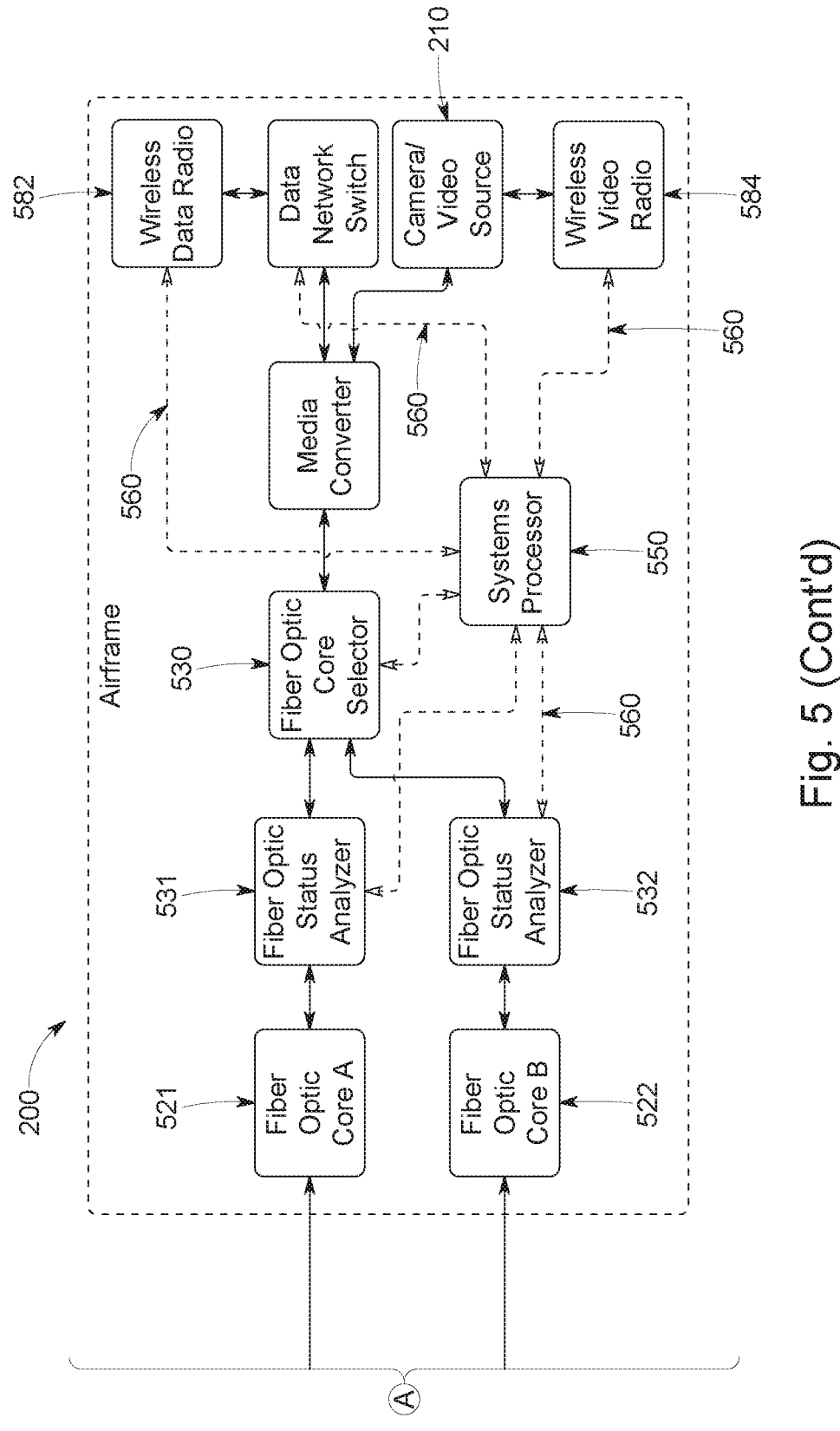

In one embodiment, the flying camera system 100 includes a power delivery system 400 to provide motive power to components disposed on the dolly. Referring to FIG. 2, powered components may include a camera, a gimbal, one or more media converters, a local controller/processor, wireless communications, and battery backup power. In one embodiment, one or more of the lifting ropes may include a two-conductor copper wire 421, 422, 423 which is used to carry power from the winch to the dolly, referred to as power down-the-line (PDL). The winches are specially designed with a slip ring allowing line voltage powering the winch, such as from remote power supply 410, to be applied to the power conductors on the winch drum.

The incoming PDL power to the dolly may be connected to a local (onboard) power supply 440 to supply the power demands for powered components of the flying camera system. The incoming line voltage may be rectified to DC and a number of additional step-down converters 470 may be used to provide the necessary power (e.g., 12 VDC, 5 VDC) to onboard electronics such as wireless radios 582, 584, the camera 210, battery chargers 455, and any other powered components 468 on the dolly. In one exemplar, the onboard power supply is an AC to DC converter, switchable for 120-220 VAC input and 24 VDC output at 20 A. Alternatively, AC to DC conversion may occur at the winch so that the incoming feed to the local power supply is DC.

Power conductors in down the line ropes are prone to inopportune failures caused by continuous spooling and unspooling of the conductors along with the rope on the winch drum. In events where loss of power is not an acceptable option, redundant power delivery systems may be provided. Multiple PDL inputs (interfaces) may be connected to the local power supply for diversity of power. Additionally, an onboard battery power supply 450 may be provided. The onboard battery power supply 450 may include one or more batteries 452, 454 and a battery charger 455 to charge the batteries from the PDL power supply when available. A power source selector 460 may be provided to control circuit alignment for the active power feed and connected loads.

The flying camera assembly 200 includes an onboard controller 550 configured to monitor and control the flying camera system power distribution. The onboard controller 550 may include a microprocessor 552, a memory device 554, and a plurality of input/output interfaces 556 allowing the microprocessor to operably communicate with other devices on the flying camera system across a data bus 560.

The data bus may be configured using known data communication standards, including but not limited to ethernet systems, TCP/IP (Transmission Control Protocol/Internet Protocol) systems, UDP (User Datagram Protocol) systems, ControlNet systems, DeviceNet systems, RS 232 systems, RS 45 systems, and CAN bus (Controller Area Network bus) systems.

The memory device 554 can include or store a main process that can include one or more sub- or co-processes that are executable by the microprocessor to provide node functionality in the master system through the input/output interfaces. The main process provides the networking and hardware interfacing to enable the sub- or co-processes to operate. Additional sub- or co-processes may be stored and executed to manage the power delivery system 400, data communications system 600, and the camera function.

The input/output interfaces 556 may receive inputs from one or more sensors 570 on the flying camera system. Sensors providing inputs may include: PDL status (voltage), battery voltage, battery charge level, onboard power supply status and load, DC power status, power loss detection circuits, and/or power saver state. A hierarchy of preferred power supplies may be provided to the onboard controller and implemented by sub-process stored and executed by the onboard controller. During normal operation, power is preferably supplied to the camera dolly by the PDL feed to the onboard power supplies and charging circuit for the onboard batteries. Status of the ground-based and onboard power supplies is continuously monitored by the controller 550. If the PDL power (or active power circuit) is lost, the power loss detection circuit detects that power has been lost and triggers the onboard controller to switch from the once active power source to a backup source. The onboard controller 550 instructs the power source selector 430 to realign the power supplies (interfaces) to a preferred backup power supply, whether an alternate PDL source or the onboard battery, to assure that power to the onboard loads is uninterrupted. The circuit realignment occurs with sufficient speed to prevent adverse operational effects.

The onboard controller 550 may include co- or sub-processes and communication mechanisms to transmit diagnostics information to and receive control commands from the ground-based control system 500. Diagnostics information may include, but is not limited to, battery charge level, power bus voltages, power source selection, and the like. From the ground-based control system a user may send commands to the onboard controller including, but not limited to, commands to switch the power delivery source, power cycle (hard reboot) the dolly, and power off system. The onboard processor interprets these commands and activates the appropriate power system circuits to achieve the desired result.

In one embodiment, the flying camera system may be designed to operate solely on the onboard battery power supply 450 for instances where PDL is not available. The battery system on the dolly may operate with one or more batteries 452, 454. When more than one battery is provided, additional switching function may be provided to enable the onboard controller 550 to control the power management system 400, treating each battery as an independent power supply and switching between the batteries should one become unavailable or depleted. This arrangement allows for hot swapping and battery replacement without depowering the flying camera system.

Data communication between the ground-based control system and the onboard control system may comprise data related to flying camera control and the video signal output. The primary video and data communication transmission path is a physical data transmission cable which may contain one or more fiber optic cores, referred to as data down-the-line (DDL). The fiber optic cores may be integral to the lifting lines. The fiber optic cores may additionally or alternatively be coupled to the dolly as a non-load bearing member. The winches are designed with an interface to allow the data cable to be spooled out or reeled in with the support ropes.

Onboard the dolly, video and data signals are converted and merged into a signal fiber optic uplink. The flying camera system 100 supports redundant signal transmission over one of more optical fibers either in the same or separate tethers. Duplicating the signal may be accomplished in a multitude of ways including but not limited to:

Using multiple protocol/media concurrently to convert video and data signals for transmission and distribute signals over discrete paths Using a passive optical splitter to split a fiber optic feed to multiple fiber optic lines Using an active optical switch to selectively switch the signal between one or more fiber optic transmission lines Any combination of the aforementioned methods and/or similar methods know to one skilled in the art In one embodiment, the flying camera system 100 includes a redundant data system 600 to enhance reliability of data and video communication between the flying camera system and the ground-based reception and control systems. The redundant data system includes a ground-based control system 500 and an onboard controller 550. The ground-based control system 500 may include a microprocessor 502, a memory device 504, and a plurality of input/output interfaces 506. The onboard controller may include a microprocessor 552, a memory device 554, and a plurality of input/output interfaces 556.

Data communication between ground-based control system and onboard controller may be by one or more data cables 521, 522, 523 routed in or along the lifting ropes 301, 302, 303 for the camera dolly and operably connected to data interfaces at each end. Each data cable may include one or more fiber optic cores. The primary video and data communication transmission path is the fiber optic core integral to the lifting lines. The fiber optic core may additionally or alternatively be coupled to the dolly as a non-load bearing member. Fiber optic interfaces 531, 532 may be provided at each of the fiber optic cables to manage data transfer and to monitor signal quality through the respective fiber optic core. Onboard the flying frame (dolly), video and data signals are converted and may be merged into a single fiber optic uplink.

Fiber optic core selectors 520, 530 may be provided to enable selection of a specific fiber optic core for data communication. The onboard control system 550 or ground-based control system 500 may include fiber optic core diagnostic capability, a function typically included in the interfaces 531, 532, enabling the operational status of the fiber optic cores to be monitored in real time. The onboard control system 550 or ground-based control system 500 may, through the fiber optic core selectors 520, 530, select the fiber optic core to be used for active data communication.

In the event an active optical switch is used to route fiber optic signals, the onboard processor 550 may also be configured to diagnose the fiber optic cores and determine whether the fiber optic transmission lines are broken or otherwise unable to transmit a signal. The onboard processor may use a number of diagnostics to make this determination, including, but not limited to: loss of light signal on the fiber core, inability to ping the system controller, or an indication is received from the system controller via the wireless link. If the primary fiber optic transmission core is determined to be inoperable, the onboard processor may be programmed to switch transmissions to an alternate fiber optic core using the fiber optic core selectors 520, 530. The diagnostic monitoring functions may be continuous or periodic with sufficient frequency for near-continuous monitoring to enable switching to occur with minimal impact on flying camera operation or video signal feed.

Data communication between the ground-based control system 500 and onboard controller 550 may also be achieved by wireless communication should the DDL data interface become unavailable. The wireless communication path includes at least one onboard wireless radio disposed on the flying camera assembly (onboard radio), at least one ground-based wireless radio, and switching devices to redirect data communications from the DDL interface to the wireless radio interface. It may be preferable to provide separate wireless interfaces for the camera video feed and the flying camera assembly control data to assure suitable bandwidth for each. The wireless system may include an onboard wireless data interface 582, an onboard video wireless interface 584, a ground-based wireless data interface 586, and a ground-based video wireless interface 588. Data switches are provided on the ground-based interfaces and the onboard interfaces to enable the controllers to select between DDL and wireless data interfaces.

The onboard wireless data radio may be continuously powered or powered only when needed. Operating state of the onboard wireless radio may be managed by the onboard controller. Wireless data and video may be transmitted concurrently in parallel, so no operation is needed to switch between the DDL and the wireless link. Upon detection of a loss of the DDL data feed, the ground-based controller would recognize the DDL signal loss but continue uninterrupted using the active wireless interface.

Additionally, or alternatively, the power management system may include a power saving mode which may be activated when the flying camera assembly is operating on battery power. In this state the wireless radios may powered off and only turned on in the event the onboard processor determines there is a loss in data transmission capability over all fiber optic cores. If so determined, the controller subsequently energizes the radios and begins using the wireless datalinks.

In another embodiment, a method of providing redundancy in critical functions of a flying camera system includes providing a first interface, a second interface, and a controller on the flying camera having sensors configured to monitor the functionality of the first and second interfaces and a control selector operably coupled to the controller to allow the first interface or the second interface to be selected based on interface functionality state.

The interfaces may supply motive power to the flying camera system. Power supplies may include one or more ground-based power supplies providing power along supporting cables for the flying camera assembly and an onboard battery power supply.

The interfaces may convey camera control data and a video feed signal between the flying camera assembly and a ground-based data system. The first interface may comprise a data cable connection between the flying camera assembly and a ground-based data system, and the second interface may comprise a wireless data connection having a first wireless radio operably connected to the onboard controller on the flying camera assembly and a second wireless radio operably connected to the ground-based data system.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the various exemplary embodiments is illustrative only. Although only a few embodiments have been described in detail in this disclosure, those skilled in the art who review this disclosure will readily appreciate that many modifications are possible without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The invention claimed is:

1. A remote camera system comprising:
a flying camera assembly having a camera and an onboard controller, the onboard controller having a microprocessor, a memory device, at least one input/output interface, and an onboard selector;
a ground-based data system having a ground-based controller, the ground-based controller having a microprocessor, a memory device, at least one input/output interface, and a ground-based selector;
a first interface comprising a first data cable connection, a second data cable connection and one or more power conductors; and
a second interface comprising a wireless data interface and an onboard power supply;
wherein the first and second interfaces convey data between the flying camera assembly and a ground-based data system;
wherein the onboard controller is configured to monitor functionality of the first interface and the second interface in real time and operably connect one or both of power or signal of the first interface or the second interface to the flying camera assembly based on interface functionality; and the onboard controller and the ground-based data systems are each configured to monitor data communication between the onboard controller and the ground-based data system in real time and operably connect the first data cable connection or a second data cable connection of the first interface based on the signal quality of the data communications to provide uninterrupted camera operation.

2. The remote camera system of claim 1, wherein the first interface provides motive power from a ground-based power supply to the flying camera assembly.

3. The remote cameras system of claim 2, wherein the second interface includes an onboard battery power supply disposed on the flying camera assembly.

4. The remote camera system of claim 3, wherein the onboard battery power supply comprises at least one battery and a charging circuit configured to provide charging energy to the at least one battery from the first interface.

5. The remote camera system of claim 4, wherein the battery power supply comprises at least two batteries and a switching circuit configured to enabling either battery to operably power the second interface.

6. The remote camera system of claim 1, further comprising a plurality of sensors operably coupled to the onboard controller configured to determine power availability in the first interface and the second interface.

7. The remote camera system of claim 6, further comprising a power loss detection circuit operably coupled to the onboard controller.

8. The remote camera system of claim 7, wherein the onboard controller operably couples the power detection circuit and the onboard selector to the onboard controller, the controller executing software to manage the onboard selector to select the first interface or the second interface.

9. The remote camera system of claim 1, wherein the data comprises camera control data and a video feed signal.

10. The remote camera system of claim 9, wherein the onboard controller may select the first interface and the second interface to be concurrently active.

11. The remote camera system of claim 1, wherein the onboard controller may select the first interface and the second interface to be concurrently active.

12. The remote camera system of claim 9, further comprising a plurality of sensors operably coupled to the onboard controller configured to determine operability of the first interface and the second interface, the controller executing software to manage the onboard selector to select the first interface or the second interface.

13. The system of claim 12, wherein the onboard controller operably couples the plurality of sensors and the onboard selector to the onboard controller, the controller executing software to manage the onboard selector to select the first interface or the second interface.

14. A method for providing redundancy in a remote flying camera control system comprising the steps of:
providing a flying camera assembly having a camera and an onboard controller, the onboard controller having a microprocessor, a memory device, at least one input/output interface, and an onboard selector;
providing a ground-based data system having a ground-based controller, the ground-based controller having a microprocessor, a memory device, at least one input/output interface, and a ground-based selector;
providing a first interface comprising a first data cable connection, a second data cable connection and one or more power conductors;
providing a second interface comprising a wireless data interface and an onboard power supply;
providing a plurality of sensors configured to monitor functionality of the first and second interfaces, the plurality of sensors being operably coupled to the onboard controller; and
programming the onboard controller to monitor functionality of the first interface and the second interface in real time and operably connect one or both of power or signal of the first interface or the second interface to the flying camera assembly based on interface functionality and programming the onboard controller and the ground-based data systems to monitor data communication between the onboard controller and the ground-based data system in real time and operably connect the first data cable connection or a second data cable connection of the first interface based on the signal quality of the data communications to provide uninterrupted continuous camera operation.

15. The method of claim 14, wherein the first and second interfaces convey camera control data and a video feed signal between the flying camera assembly and the ground-based data system.

16. The method of claim 15, wherein the second interface is a wireless data connection comprising a first wireless radio operably connected to the onboard controller on the flying camera assembly and a second wireless radio operably connected to the ground-based data system, the onboard controller operably managing the onboard selector to select the first interface or the second interface.

17. The method of claim 14, wherein the first interface provides motive power from a ground-based power supply to the flying camera assembly and the second interface is an onboard battery power supply disposed on the flying camera assembly, the onboard controller operably managing the onboard selector to select the first interface or the second interface.

\* \* \* \* \*